(12) United States Patent
Chen

(10) Patent No.: US 12,085,176 B2
(45) Date of Patent: Sep. 10, 2024

(54) SWITCHING VALVE

(71) Applicant: Nanchang Kohler Ltd., Nanchang (CN)

(72) Inventor: Shenghe Chen, Nanchang (CN)

(73) Assignee: NANCHANG KOHLER LTD., Nanchang (CN)

(*) Notice: Subject to any disclaimer, the term of this patent is extended or adjusted under 35 U.S.C. 154(b) by 0 days.

(21) Appl. No.: 18/488,297

(22) Filed: Oct. 17, 2023

(65) Prior Publication Data

US 2024/0044412 A1 Feb. 8, 2024

Related U.S. Application Data

(63) Continuation of application No. 17/738,242, filed on May 6, 2022, now Pat. No. 11,815,188.

(30) Foreign Application Priority Data

May 31, 2021 (CN) .......................... 202121199059.X

(51) Int. Cl.
F16K 11/16 (2006.01)
F16K 11/22 (2006.01)
(Continued)

(52) U.S. Cl.
CPC ............ F16K 11/161 (2013.01); F16K 11/22 (2013.01); F16K 35/14 (2013.01); B05B 1/18 (2013.01); B05B 3/0422 (2013.01); B05B 12/002 (2013.01)

(58) Field of Classification Search
CPC ........ F16K 11/161; F16K 11/22; F16K 35/14; B05B 1/18; B05B 3/0422; B05B 12/002
(Continued)

(56) References Cited

U.S. PATENT DOCUMENTS 1,116,729 A 11/1914 Potolsky
4,241,761 A 12/1980 Miller
(Continued)

FOREIGN PATENT DOCUMENTS

CN 110000018 7/2019
CN 110076016 8/2019
(Continued)

OTHER PUBLICATIONS

Extended European Search Report issued in connection with EP Appl. Ser. No. 22172660.7 dated Oct. 25, 2022 (9 pages).

Primary Examiner — Minh Q Le
(74) Attorney, Agent, or Firm — FOLEY & LARDNER LLP

(57) ABSTRACT

A switching valve includes a base including a bottom wall and a side wall that extends from the bottom wall of the base along a circumferential direction of the bottom wall, a body that can couple to the base to define a cavity between a bottom plate of the body and the bottom wall and the side wall of the base, in which the bottom plate includes two through holes that are each fluidly coupled to the cavity, two sliders disposed within the cavity, and two driving rods each movably coupled to one of the two through holes of the body, in which each driving rod can move relative to the two through holes to block or unblock each respective through hole. Each slider can slide responsive to movement of one of the two driving rods such that only one through hole is unblocked at one time.

20 Claims, 7 Drawing Sheets

(51) Int. Cl.
 *F16K 35/14* (2006.01)
 *B05B 1/18* (2006.01)
 *B05B 3/04* (2006.01)
 *B05B 12/00* (2018.01)
(58) Field of Classification Search
 USPC .................................................. 137/625.48
 See application file for complete search history.

(56) References Cited

U.S. PATENT DOCUMENTS

| | | | |
|---|---|---|---|
| 4,721,133 | A | 1/1988 | Sundblom |
| 5,765,591 | A | 6/1998 | Wasson et al. |
| 6,394,136 | B1 | 5/2002 | Rohrbeck |
| 6,834,675 | B1 | 12/2004 | Gill |
| 8,752,584 | B2 | 6/2014 | Grandvallet et al. |
| 9,199,252 | B2 | 12/2015 | Schorn et al. |
| 9,227,207 | B1 | 1/2016 | Bredberg et al. |
| 9,849,472 | B2 | 12/2017 | Ayers |
| 9,939,071 | B2 | 4/2018 | Lin et al. |
| 10,058,878 | B2 | 8/2018 | Hu et al. |
| 10,391,504 | B2 | 8/2019 | Lin et al. |
| 10,441,960 | B2 | 10/2019 | Rogers |
| 10,578,222 | B2 | 3/2020 | Huang et al. |
| 10,618,063 | B2 | 4/2020 | Lin et al. |
| 10,625,279 | B2 | 4/2020 | L'Henaff et al. |
| 10,799,889 | B2 | 10/2020 | Lin et al. |
| 10,871,236 | B2 | 12/2020 | Kinle et al. |
| 10,875,037 | B2 | 12/2020 | Lin et al. |
| 10,919,056 | B2 | 2/2021 | Luo et al. |
| 10,946,394 | B2 | 3/2021 | Hu et al. |
| 10,955,061 | B2 | 3/2021 | Ye et al. |
| 11,052,410 | B2 | 7/2021 | Blattner et al. |
| 11,179,735 | B2 | 11/2021 | Wu et al. |
| 11,185,154 | B2 | 11/2021 | Wu et al. |
| 2012/0318389 | A1 | 12/2012 | Holstein et al. |
| 2013/0239320 | A1 | 9/2013 | Aihara et al. |
| 2013/0327431 | A1 | 12/2013 | Zhou et al. |
| 2019/0219184 | A1 | 7/2019 | Huang et al. |
| 2019/0366358 | A1 | 12/2019 | Rogers et al. |
| 2020/0086333 | A1 | 3/2020 | Matsui et al. |
| 2020/0147627 | A1 | 5/2020 | Lin et al. |
| 2020/0353486 | A1 | 11/2020 | Lin et al. |
| 2021/0008580 | A1 | 1/2021 | Shi et al. |
| 2021/0016304 | A1 | 1/2021 | Wu et al. |
| 2021/0121897 | A1 | 4/2021 | Lin et al. |
| 2021/0197216 | A1 | 7/2021 | Wang et al. |
| 2021/0207728 | A1 | 7/2021 | Alali et al. |
| 2021/0245178 | A1 | 8/2021 | Rogers |
| 2021/0316322 | A1 | 10/2021 | Chang |
| 2021/0341063 | A1 | 11/2021 | Chen |
| 2021/0372535 | A1 | 12/2021 | Xia |
| 2022/0033750 | A1 | 2/2022 | Lundin et al. |
| 2023/0201845 | A1* | 6/2023 | Frye ............... B05B 12/002 239/439 |
| 2023/0271200 | A1* | 8/2023 | Lee ............... B05B 12/02 239/443 |
| 2023/0407975 | A1* | 12/2023 | Strmsek ............ F16K 31/44 |

FOREIGN PATENT DOCUMENTS

| | | |
|---|---|---|
| CN | 110841812 | 2/2020 |
| CN | 111167624 | 5/2020 |
| CN | 112275481 | 1/2021 |
| CN | 212455616 U | 2/2021 |
| CN | 113304900 | 8/2021 |
| CN | 113385315 | 9/2021 |
| CN | 113560053 | 10/2021 |
| DE | 11 40 417 | 11/1962 |
| EP | 3 599 027 | 1/2020 |
| WO | WO-2014/076238 | 5/2014 |
| WO | WO-2020/229806 | 11/2020 |
| WO | WO-2021/187761 | 9/2021 |

* cited by examiner

SWITCHING VALVE

CROSS-REFERENCE TO RELATED PATENT APPLICATION

This application is a Continuation of U.S. patent application Ser. No. 17/738,242, filed May 6, 2022, which claims the benefit of and priority to Chinese Patent Application No. 202121199059.X, filed May 31, 2021, the entire disclosures of which are incorporated by reference herein.

BACKGROUND

In various industries, a water dispensing device, such as a shower or faucet, can include one or more components to facilitate discharging water at various water discharge modes. For example, a showerhead can include a valve to facilitate switching between various water discharge functions. A switching valve, for example, can switch between various water chambers or outlets to select one or more outlet modes.

SUMMARY

At least one aspect of the present disclosure is directed towards a switching valve. The switching valve includes a base having a bottom wall. The switching valve includes a body that couples to the base to define a cavity between the body and the base. The body includes a bottom plate having at least two through holes that are each fluidly coupled to the cavity. The switching valve includes a driven slider set disposed within the cavity and having at least two sub-sliders. The switching valve includes at least two driving rods each movably coupled to one of the at least two through holes of the body. Each driving rod moves in a first linear direction relative to the at least two through holes to block or unblock each respective through hole. Each sub-slider slides in a second linear direction responsive to movement of one of the at least two driving rods. A first of the at least two through holes fluidly couples to a first discharge pipeline of the body and a second of the at least two through holes fluidly couples to a second discharge pipeline that is independent from the first discharge pipeline. The at least two driving rods and the driven slider set are configured such that only one through hole of the at least two through holes is unblocked at one time.

At least one aspect of the present disclosure is directed towards a switching valve. The switching valve includes a body comprising a fluid inlet, a plurality of fluid outlets, and a plurality of through holes. Each of the plurality of through holes fluidly couples the fluid inlet to a corresponding fluid outlet of the plurality of fluid outlets. The switching valve further includes a plurality of driving rods each corresponding to a through hole of the plurality of through holes and configured to move in a first linear direction to block or unblock the corresponding through hole, and a plurality of sub-sliders each corresponding to a driving rod of the plurality of driving rods and configured to move in a second linear direction between an independent space and a shared space responsive to movement of the corresponding driving rod. Movement of a first driving rod of the plurality of driving rods into a position that unblocks a first through hole of the plurality of through holes causes movement of a first sub-slider of the plurality of sub-sliders into the shared space. Movement of the first sub-slider of the plurality of sub-sliders into the shared space causes a second sub-slider of the plurality of sub-sliders to move out of the shared space. Movement of the second sub-slider out of the shared space causes movement of a second driving rod of the plurality of driving rods into a position that blocks a second through hole of the plurality of through holes such that only one through hole of the plurality of through holes is unblocked at one time.

DETAILED DESCRIPTION

Referring generally to the FIGURES, provided herein are switching valves that are configured to switch between one or more different outlets. The switching valve includes a base having an inlet, a body coupled to the base and having at least two discharge pipelines in fluid communication with one or more outlets, a cover plate that covers the discharge pipelines, at least two driving rods penetrating through holes in the body and movable in a first linear direction, and at least two driven sliders disposed in the base below the driving rods and movable in a second linear direction, in which the driving rods and driven sliders selectively switch a fluid pathway between the inlet and the discharge pipelines. The base includes at least one hollow portion and the body is coupled to the base to form a cavity defined by the at least one hollow portion. The inlet of the base can fluidly couple to an external source for providing a fluid (e.g., water) to the base. After the fluid enters the cavity of the base, the driving rods and the driven sliders jointly select one through hole of the body that is fluidly coupled to one of the discharge pipelines such that water discharges out of a selected subset of outlets. For example, one driving rod can be pressed downward such that the driving rod engages with a corresponding driven slider located in the cavity of the base to cause the slider to slide in a horizontal manner. Such movement provides a transmission pathway for fluid to flow from the inlet of the base, through a through hole of the body in which the pressed driving rod is coupled to, and out a corresponding discharge pipeline and outlet.

The switching valves described herein have a technical advantage of switching between two or more discharge pipelines by a one-touch operation. For example, a single operation of a driving rod (e.g., pressing or pushing the driving rod) causes the driving rod to enter a transmission cavity of a first driven slider to open a first discharge pipeline. The first driven slider can engage with a second driven slider such that movement of one driven slider causes movement of the second driven slider in an opposite direction to close a second discharge pipeline. In this manner, a single operation of a driving rod simultaneously opens a first discharge pipeline and closes a second discharge pipeline. The cavity of the base provides a mounting and limiting space for the driven sliders and the driven sliders may slide back and forth around a guide rod in the cavity of the base, so as to facilitate opening or closing a discharge pipeline.

Figure 1:
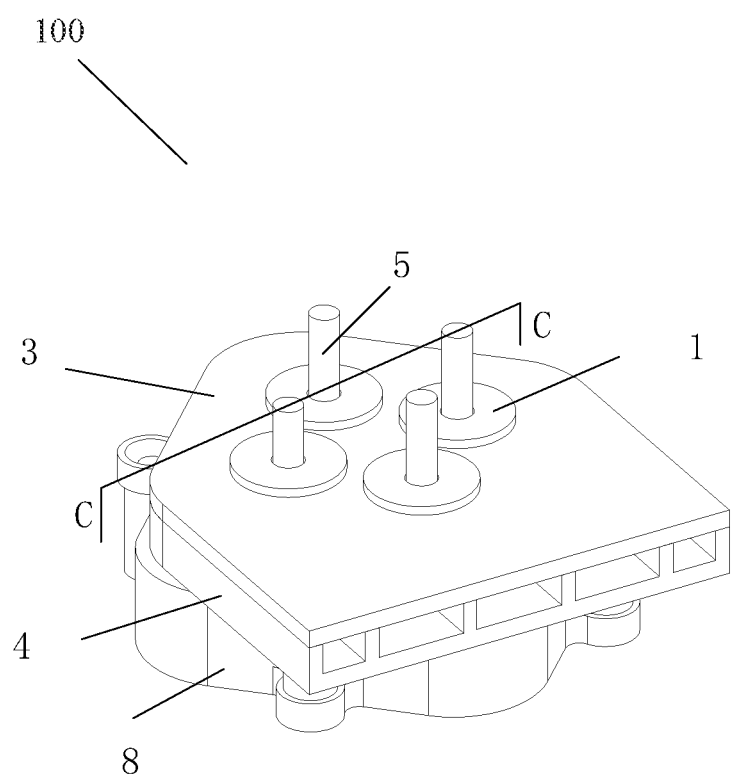
FIG. 1 is a perspective view of a switching valve, according to an exemplary embodiment.
Figure 2:
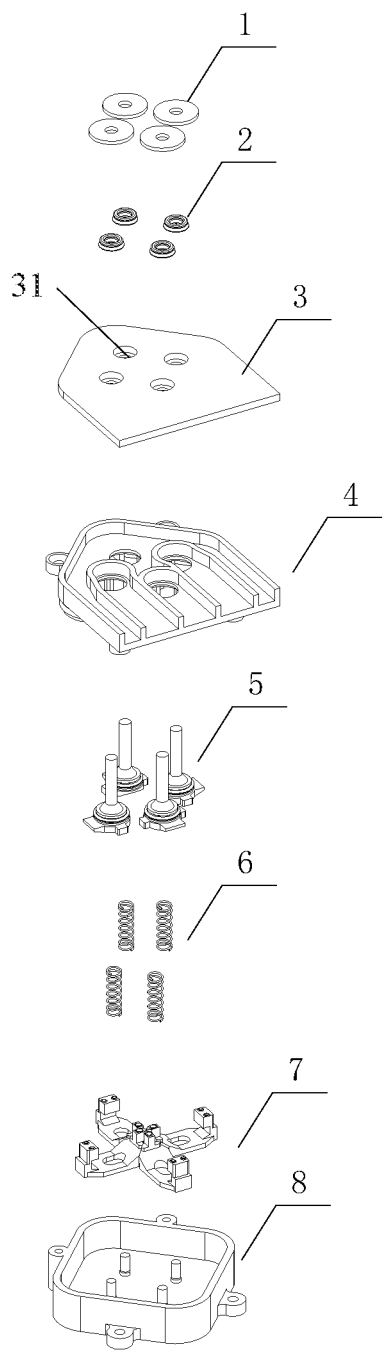
FIG. 2 is an exploded view of the switching valve shown in FIG. 1, according to an exemplary embodiment.

FIG. 1 depicts a perspective view of a switching valve 100, according to an exemplary embodiment. FIG. 2 depicts an exploded view of the switching valve 100. As shown in FIG. 1 and FIG. 2, the switching valve 100 can include a base 8, a body 4 coupled to the base, a driven slider set 7 disposed within the base 8, and at least two driving rods 5 penetrating into a portion of the body 4 and the base 8.

Figure 3:
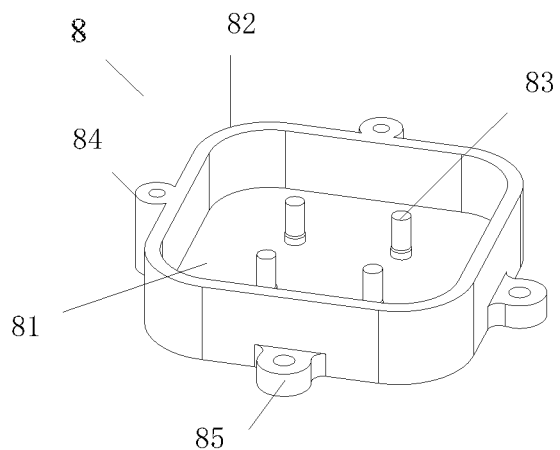
FIG. 3 is a perspective view of a base of the switching valve shown in FIG. 1, according to an exemplary embodiment.

FIG. 3 is detailed perspective view of the base 8 of the switching valve 100, according to an exemplary embodiment. As shown in FIG. 3, the base 8 can include a base bottom plate 81 and a base side wall 82. In some embodiments, the base side wall 82 can extend from the base bottom plate 81 along a circumferential direction. For example, the base side wall 82 can circumferentially surround the base bottom plate 81 to form a cavity (e.g., hollow space, chamber, opening, reservoir, etc.) within the base side wall 82. The body 4 can hermetically couple to the base side wall 82 such that the body 4 at least partially encloses or surrounds the cavity formed by the base side wall 82.

The base 8 can include at least two guide rods 83. For example, the guide rods 83 can be or can include one or more projections, extensions, pipes, rods, shafts, or other elements configured to receive a limiting hole described herein. In some embodiments, the guide rods 83 are evenly distributed on the base bottom plate 81 (e.g., equally spaced apart a center portion of the base bottom plate 81, equidistant relative to each other, etc.). In some embodiments, the guide rods 83 may be unevenly distributed.

Figure 4:
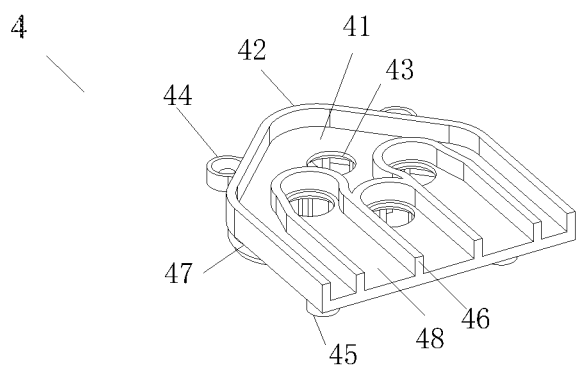
FIG. 4 is a perspective view of a body of the switching valve shown in FIG. 1, according to an exemplary embodiment.

FIG. 4 is a detailed perspective view of the body 4 of the switching valve, according to an exemplary embodiment. As shown in FIG. 4, the body 4 can include a body bottom plate 41 and a body side wall 42. In some embodiments, the body side wall 42 can extend from the body bottom plate 41 along a circumferential direction such that the body side wall 42 at least partially surrounds a periphery of the body bottom plate 41. In some embodiments, a cover plate 3 (depicted in at least FIGS. 1 and 2) can abut against the body side wall 42. For example, at least a portion of the body side wall 42 can receive a portion of the cover plate 3 such that the cover plate 3 couples to the body 4 (e.g., abuts a top portion of the body side wall 42 as shown in FIG. 1) and opposes the body bottom plate 41.

As shown in FIGS. 2 and 4, the body 4 and the cover plate 3 can each include at least one through hole. For example, the cover plate 3 can include a cover through hole 31 and the body 4 can include a corresponding body through hole 43 that at least partially aligns with the through hole 31 of the cover plate 3 when the cover plate 3 is coupled to the body 4. In some embodiments, the cover plate 3 has the same shape as the body bottom plate 41. In some embodiments, the cover plate 3 may include a different shape. The through holes 31 of the cover plate 3 and the through holes 43 of the body 4 can be evenly distributed about the cover plate 3 and/or the body 4.

Each of the cover through holes 31 and the body through holes 43 can receive at least a portion of a driving rod 5. As described herein, the driving rods 5 can control connection or disconnection between discharge pipelines of the body 4 and the cavity of the base 8 by blocking or unblocking the plurality of through holes 43.

The through hole 31 of the cover plate 3 and the through hole 43 of the body 4 can each receive one driving rod 5. For example, a first through hole 31 of the cover plate 3 and a first through hole 43 of the body 4 can receive the same driving rod 5. As shown in FIGS. 2-4, the cover plate 3 can include four through holes 31 and the body 4 can include four corresponding through holes 43 that each align with a respective through hole 31 of the cover plate 3 and that each receive one of four respective driving rods 5. This example is for illustrative purposes. The cover plate 3 and/or the body 4 can include more or less through holes (e.g., one through hole, two through holes, three through holes, five through holes, etc.).

The base 8, the body 4, and the cover plate 3 can form one or more fluid pipelines or chambers when coupled. For example, the switching valve 100 can include at least two independent discharge pipelines (e.g., pathways for fluid to flow). Each of the independent discharge pipelines can correspond to a through hole 43 of the body 4. For example, fluid can flow independently between each of the through holes 43 depending on a fluid discharge mode described herein.

Each driving rod 5 can penetrate through the corresponding through holes (e.g., the through holes 31 and the through holes 43) and can move vertically relative to the body 4 (e.g., in a direction substantially parallel to an axial direction of each through hole). Each of the through holes 43 of the body can fluidly couple to the cavity of the base 8. As described herein, each driving rod 5 can selectively block and/or seal its corresponding through hole 43 to selectively allow or prevent fluid from flowing from the cavity of the base 8 to the discharge pipelines fluidly coupled to the through holes 43.

The base 8 can include at least one inlet that receives fluid and provides fluid to the cavity. The body 4 can include at least two outlets 48 fluidly coupled to respective through holes 43. With this configuration, fluid enters the cavity of the base 8 through the inlet, passes through an unblocked through hole 43, and expels out of one or more of the outlets 48 in fluid communication with the unblocked through hole 43. In some embodiments, the inlet of the base 8 is positioned on the base side wall 82 (e.g., the base side wall 82 includes an opening to receive water or other fluids).

In some embodiments, the base side wall 82 includes two base supporting posts 84 (e.g., rods, shafts, or other components having one or more apertures) and two base locking seats 85 (e.g., extensions having one or more apertures). For example, in some embodiments, the base 8 includes a generally rectangular shape having four adjacent walls that define the base side wall 82. In these embodiments, the two base supporting posts 84 can be located on two adjacent edges of the base side wall 82 and the two base locking seats 85 can be located on the other two adjacent edges of the base side wall 82, as shown in FIG. 3. The base supporting posts 84 and the base locking seats 85 can facilitate coupling the base 8 to the body 4. For example, the base supporting posts 84 and the base locking seats 85 can each couple to corresponding components on corresponding positions of the body 4 (e.g., the locking seats 44 and the body supporting posts 45 described herein). In some embodiments, the base 8 can include various other shapes including, but not limited to, triangular, pentagonal, or another shape.

In some embodiments, the body 4 and the base 8 can couple by one or more liquid-tight welded joints. In some embodiments, the body 4 and the base 8 can couple to one another in various additional and/or alternative ways including, but not limited to, by fasteners or adhesives. In some embodiments, the switching valve 100 can include a sealing gasket (e.g., a seal, a gasket, a grommet, etc.) positioned between surfaces of the body 4 and the base 8. For example, the body 4 can include a groove positioned at a middle and/or lower portion of the body 4 that receives the sealing gasket such that the sealing gasket can be sleeved onto the body 4 at the groove. The sealing gasket can make contact with an inner wall of the base 8 to facilitate forming a liquid-tight (e.g., hermetic) seal between the body 4 and the base 8.

In some embodiments, the amount of outlets 48 corresponds to the amount of through holes 43. In some embodiments, the amount of outlets 48 is greater than the amount of through holes 43. For example, the body 4 can include outlets 48 that are each in fluid communication with one of the through holes 43. When one of the through holes 43 is open (e.g., unblocked, selected, unsealed), fluid enters the open through hole 43 and flows out through the one or more outlets 48 fluidly coupled to the open through hole 43.

In the exemplary embodiment depicted in FIG. 4, the body 4 includes five outlets 48 which are all positioned on a side portion of the body bottom plate 41. Each of the outlets 48 can be fluidly coupled to one through hole 43. For example, the three center outlets 48 can each be fluidly coupled to one of the through holes 43. The two outer outlets 48 can both be coupled to the remaining through hole 43, as shown in FIG. 4. It should be understood that the body 4 can include a various amount of through holes 43 and/or outlets 48.

As shown in FIG. 4, the body bottom plate 41 can include at least one partition plate 46. For example, each partition plate 46 can form each fluid discharge pipeline between each through hole 43 and the corresponding outlets 48. In other words, the partition plates 46 facilitate guiding fluid to flow to a corresponding outlet 48 after passing through each through hole 43. The cover plate 3 can abut and/or contact each partition plate 46 when the cover plate 3 is coupled to the body 4 such that each discharge pipeline is independent (e.g., fluid between two discharge pipelines does not mix or combine).

At least a portion of the partition plates 46 can be linear such that at least two partition plates 46 extend parallel to one another. In some embodiments, at least a portion of the partition plates 46 can include an arc shape to at least partially surround a through hole 43, as shown in FIG. 4, to facilitate separating each through hole 43 from one another.

In the exemplary embodiment depicted in FIG. 4, the body 4 includes four fluid pipelines to provide four water discharge modes (e.g., a first mode distributing water to each of the two end outlets 48, a second mode distributing water to one of the three center outlets 48, a third mode distributing water to another of the three center outlets 48, and a fourth mode distributing water to the third of the three center outlets 48).

In some embodiments, the body side wall 42 extends from at least two side edges of the body bottom plate 41. For example, the body side wall 42 can extend from three of four side edges of the body bottom plate 41 such that the fourth side edge includes the five sequentially positioned outlets 48 separated by the four partition plates 46. As described herein, the arc-shaped portions of the partition plates 46 can at least partially surround one or more of the through holes 43 (e.g., the three through holes 43 positioned closest to the outlets 48) such that the partition plates 46 separate each through hole 43 from one another to form the independent discharge pipelines.

As shown in FIG. 4, the body bottom plate 41 can include a generally "n" shape. In some embodiments, the body bottom plate 41 can include various other shapes including, but not limited to, rectangular, circular, triangular, or another shape. In some embodiments, the body 4 can include two body supporting posts 45 (e.g., rods, shafts, projections, extensions, etc.) and two body locking seats 44 (e.g., rods, shafts, projections, extensions, slots, openings, apertures, etc.). The two body supporting posts 45 can be positioned along two adjacent edges of the body side wall 42 and the two body locking seats 44 can be positioned along two opposing sides of the body bottom plate 41. In some embodiments, the two body supporting posts 45 can respectively couple to two base locking seats 85 and the two body locking seats 44 can respectively couple to the two base supporting posts 84.

In some embodiments, the body bottom plate 41 includes a bulge 47 along a circumferential direction. For example, the bulge 47 can be or can include one or more spacers, seals, or other components that can be inserted into the base 8 to facilitate coupling the body 4 to the base 8 in a liquid-tight manner. The bulge 47 can be welded and sealed to the base 8, for example. In some embodiments, the bulge 47 can include one or more sealing gaskets (e.g., O-rings, grommets, or other seals).

In some embodiments, the switching valve 100 can include at least one through hole cover 1 (e.g., a washer, plate, or similar cover) that can cover one of the through holes 31 of the cover plate 3. The through hole cover 1 can include an aperture to receive a portion of the driving rod 5 that penetrates the covered through hole 31. The through hole cover 1 can couple to the body 4 (e.g., can couple to the cover plate 3) in various ways including, but not limited to, fasteners, welding, and/or adhesives. It should be noted that the through hole cover 1 can include the same amount of openings corresponding to an amount of driving rods 5 such that each driving rod 5 couples to the through hole cover 1. Alternatively and/or additionally, the switching valve 100 can include one through hole cover 1 for each driving rod 5.

The switching valve 100 can include at least one sealing ring 2 having at least one opening to receive a portion of each driving rod 5. The sealing ring 2 (e.g., a gasket, sealing bushing, O-ring, grommet, or other seal) can be disposed within a portion of a through hole 31 of the cover plate 3. The sealing ring 2 can facilitate sealing the through hole 31 of the cover plate 3 such that fluid does not flow through the through hole 31. For example, the sealing ring 2 can be formed of one or more elastic materials, such as rubber, to elastically deform and fit within a portion of a through hole 31. In some embodiments, the through hole cover 1 can facilitate fixing the sealing ring 2 to the cover plate 3. For example, the through hole cover 1 can cover the through hole 31 of the cover plate 3 having the sealing ring 2 such that the sealing ring 2 is not exposed. In some embodiments, the body 4 and the through hole cover 1 may be made of the same material, such as a metallic material or non-metallic material (e.g., plastic).

Figure 5:
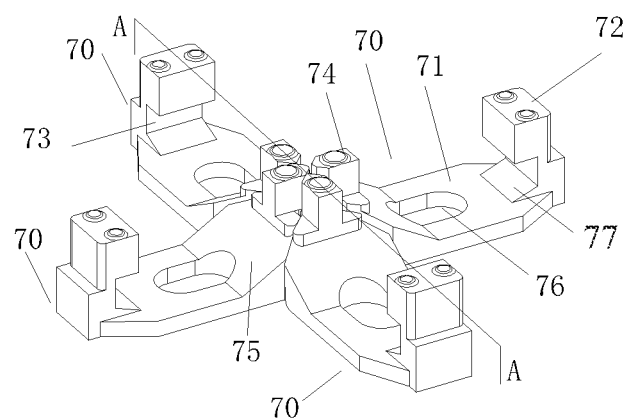
FIG. 5 is a perspective view of a driven slider set of the switching valve shown in FIG. 1, according to an exemplary embodiment.
Figure 6:
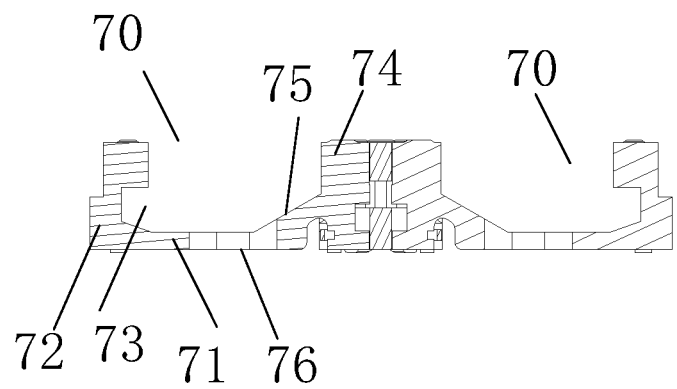
FIG. 6 is a cross-sectional view of the driven slider set shown in FIG. 5 along line A-A, according to an exemplary embodiment.

FIG. 5 is a perspective view of the driven slider set 7 of the switching valve 100 and FIG. 6 is a cross-sectional view of a portion of the driven slider set 7, according to an exemplary embodiment. As shown in FIGS. 5 and 6, the driven slider set 7 can include at least two sub-sliders 70. In some embodiments, the driven slider set 7 can include the same amount of sub-sliders 70 as through holes 43 and/or as discharge pipelines. For example, the switching valve 100 can include four through holes 43 and four sub-sliders 70. The switching valve 100 can include more or less through holes 43 and/or sub-sliders 70 (e.g., two, three, four, etc.).

Figure 7:
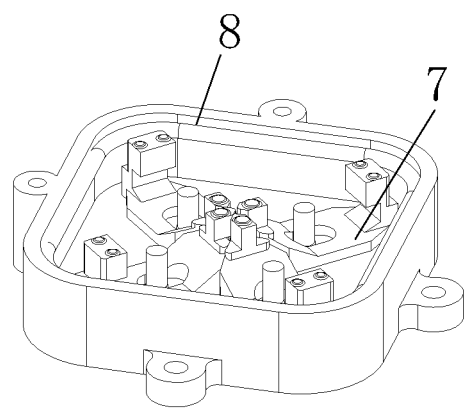
FIG. 7 is a perspective view of the base and the driven slider set of the switching valve shown in FIG. 1 in a coupled state, according to an exemplary embodiment.
Figure 8:
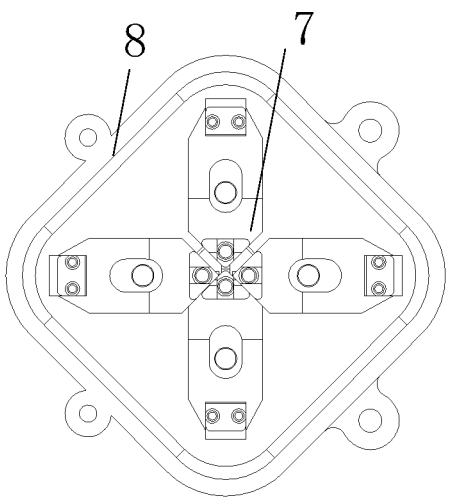
FIG. 8 is a top view of the base and the driven slider set of the switching valve shown in FIG. 1 in a coupled state, according to an exemplary embodiment.

FIG. 7 is a perspective view of the base 8 and the driven slider set 7 of the switching valve 100 in a coupled state (e.g., the base 8 and the driven slider set 7 are coupled). FIG. 8 is a top view of the base 8 and the driven slider set 7 of the switching valve 100 in a coupled state (e.g., the base 8 and the driver slider set 7 are coupled and the bottom most sub-slider 70 is in an open state).

As shown in FIGS. 5-8, the sub-sliders 70 can be equally spaced about the driven slider set 7. For example, the driven slider set 7 can be disposed within the cavity of the base 8 and each sub-slider 70 of the driven slider set 7 can be equally distributed in a circumferential direction about a center portion of the base 8. By way of example, if there are two sub-sliders 70, the sub-sliders 70 can oppose one another along a diagonal of the base 8 (e.g., between two corners or edges of the base side wall 82). If there are three sub-sliders 70, the sub-sliders 70 can be evenly distributed within the cavity of the base 8 at intervals (e.g., at equal angles relative to one another).

Each sub-slider 70 can include a transmission cavity (e.g., an opening or space) that receives fluid from the inlet of the base 8 and transmits fluid to a corresponding through hole 43. For example, each sub-slider 70 can include a sliding plate 71, a limiting wall 72, and a transmission wall 74. In some embodiments, the limiting wall 72 and the transmission wall 74 can be positioned on two opposite sides of the sliding plate 71. The sliding plate 71, the limiting wall 72, and the transmission wall 74 can jointly form the transmission cavity (e.g., each transmission cavity is defined by the space between each sliding plate 71, each limiting wall 72, and each transmission wall 74).

Each sliding plate 71 of the sub-sliders 70 can include at least one limiting hole 76 (e.g., an oblong hole, a slot) that penetrates the transmission cavity and that receives a guide rod 83 of the base 8. For example, the limiting hole 76 of each sub-slider 70 can be sleeved on one guide rod 83 such that each sub-slider 70 can slide back and forth around the guide rod 83 by the limiting hole 76. In this manner, the maximum movement range of the sub-slider 70 is limited by the guide rod 83 within the limiting hole 76 (e.g., the sub-slider 70 can move about the same distance as a maximum dimension of the limiting hole 76).

Each limiting wall 72 can include a limiting locking groove 73 and each transmission wall 74 can include a wedge guide face 75 that couples the transmission wall 74 to the sliding plate 71. As described herein, when a driving rod 5 is pressed in a downward direction to move from a top end of the transmission cavity to the bottom end, a portion of the driving rod 5 pushes against the wedge guide face 75 to cause the sub-slider 70 to move towards a center portion of the base 8 such that the driving rod 5 moves towards the limiting locking groove 73. When a portion of the driving rod 5 is positioned within the limiting locking groove 73, the driving rod 5 is prevented from moving in an upward direction.

In some embodiments, the limiting locking groove 73 can be located in a vertical direction at a middle or lower portion of the limiting wall 72. In some embodiments, a portion of the limiting locking groove 73 close to the sliding plate 71 extends in at an angle such that a height of the limiting locking groove 73 is gradually reduced from the sliding plate 71 towards the limiting wall 72, as shown by angled plate 77 in FIG. 6.

In some embodiments, the wedge guide face 75 can be located at a lower portion of the transmission wall 74 and can extend towards the sliding plate 71. In some embodiments, a top portion of the wedge guide face 75 can be aligned with a top portion of the limiting locking groove 73 in a horizontal direction (e.g., the height of the limiting locking groove 73 is about equal to the height of the wedge guide face 75). In some embodiments, an inclination angle between the wedge guide face 75 and the transmission wall 74 can be an obtuse angle. In this configuration, downward movement of the driving rod 5 can cause the sub-slider to be pushed (e.g., at the wedge guide face 75) such that the sub-slider 70 slides relative to the base 8 and the driving rod 5.

In some embodiments, a portion of the limiting wall 72 can include a relief groove (e.g., an opening, indent, angled surface, etc.) such that, during a movement of the sub-slider 70, the relief groove can facilitate preventing interference between the sub-slider 70 and the body 4. In some embodiments, a bottom portion of the sliding plate 71 can include at least two supporting seats and a top portion each of the limiting wall 72 and the transmission wall 74 can include at least one supporting seat. The supporting seat can include various components (e.g., bearings, bushings, rollers, etc.) to facilitate reducing friction between contact areas of the sub-slider 70 with the base 8 and the body 4 such that the sub-sliders 70 can easily move relative to the base 8.

Figure 9:
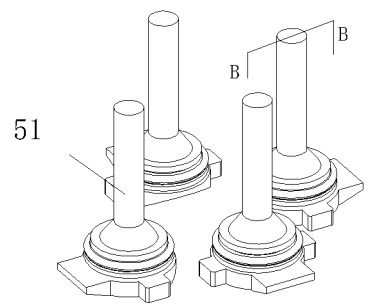
FIG. 9 is a perspective view of driving rods of the switching valve shown in FIG. 1, according to an exemplary embodiment.
Figure 10:
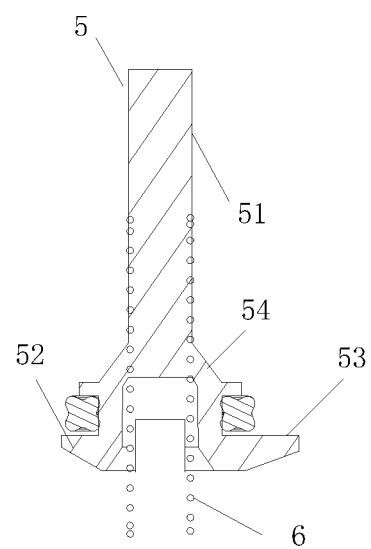
FIG. 10 is a cross-sectional view of a driving rod shown in FIG. 9 along line B-B, according to an exemplary embodiment.

FIG. 9 is a perspective view of the driving rods 5 of the switching valve 100, according to an exemplary embodiment. FIG. 10 is a cross-sectional view one driving rod 5 of the switching valve 100, according to an exemplary embodiment. As shown in FIG. 9 and FIG. 10, the driving rod 5 can include a driving pedestal (e.g., the lower portion having a driving block 52, a limiting block 53, and a sealing seat 54) and a rod body 51. As shown, the rod body 51 can extend from the driving pedestal such that the driving pedestal increases an overall height of the rod body 51. In some embodiments, the driving pedestal can include a limiting block 53 (e.g., a projection) disposed along a first side of the driving pedestal and a driving block 52 (e.g., a projection) disposed along a second side of the driving pedestal. As described herein, the driving block 52 can engage with a corresponding wedge guide face 75 of a sub-slider 70 and the limiting block 53 can engage with a corresponding limiting locking groove 73 of a sub-slider 70.

The driving pedestal can include one or more grooves (e.g., channels, openings, canals, etc.) that extend from the driving pedestal towards one side of the rod body 51. In some embodiments, the driving rod 5 can include a spring 6 coupled to the groove. The spring 6 can facilitate biasing each driving rod 5 in an upward direction (e.g., towards the body 4). The driving pedestal can include a sealing seat 54 positioned between the driving pedestal and the rod body 51 to facilitate sealing the through hole 43 from fluid when the driving rod 5 closes the through hole 43.

Referring briefly to FIG. 1, at least a portion of the driving rod 5 can extend from the body 4 of the switching valve 100 such that at least a portion of the driving rod 5 is visible or accessible outside of the body 4. For example, the rod body 51 can extend outside the body 4 through the through hole 31 of the cover plate 3 and the through hole 43 of the body 4. In some embodiments, the driving rods 5 can be positioned within a water discharging device (e.g., a handheld showerhead, a fixed showerhead, a faucet, a spray head, etc.) such that a user of the water discharging device can access and/or press one or more of the driving rods 5.

At least a portion of the driving rod 5 can be disposed within the body 4 to facilitate blocking or unblocking a through hole 43. For example, each driving pedestal can be located in a corresponding transmission cavity of a sub-slider 70. The driving pedestal can move up and down between the body bottom plate 41 and the bottom of the transmission cavity (e.g., adjacent the limiting hole 76) to open or close the through hole 43. For example, when the driving rod 5 is in an upward most position, the driving pedestal abuts against the body bottom plate 41 to seal the corresponding through hole 43 and block fluid from flowing between the body 4 and the cavity of the base 8 through the sealed through hole 43. When the driving rod 5 moves downward such that the driving pedestal is placed in the transmission cavity, the driving pedestal is positioned at a distance from the through hole 43 to allow fluid to flow between the body 4 and the cavity of the base 8 through the unblocked through hole 43.

When actuated, the driving rods 5 can move down into the transmission cavities defined by the sub-sliders 70 such that the through holes 43 in the body 4 are unsealed and fluid can flow out of the outlets 48 after entering the corresponding discharge pipelines. Alternatively and/or additionally, the driving rods 5 can move up and withdraw from the transmission cavities of the sub-sliders 70 such that the through holes 43 in the body 4 are sealed and fluid cannot enter the body 4.

For example, as described below with reference to FIGS. 11 and 12, when the driving rod 5 moves from a top positon to a bottom position, the driving block 52 of the driving rod 5 engages with and pushes the wedge guide face 75 of the sub-slider such that the sub-slider 70 slides along the base 8 about the guide rod 83 towards a center portion of the base 8. When the sub-slider 70 moves, the limiting locking groove 73 moves towards the driving rod 5 such that the limiting block 53 of the driving rod 5 enters the limiting locking groove 73 to facilitate limiting a position of the driving rod 5 (e.g., limiting at least a portion of the driving rod 5 from moving in a vertical direction). While one driving rod 5 is in a downward (e.g., bottom) position, if another driving rod 5 (e.g., a second driving rod 5 in an upward position) is pressed downward, one or more of the other sub-sliders 70 can move towards the center portion of the base 8 such that the limiting block 53 can withdraw from the limiting locking groove 73 and, due to a biasing force of the spring 6, the driving rod 5 that was initially in a downward position is moved from the bottom to the top to reset and close the corresponding through hole 43. The driven slider set 7 can be positioned such that only one sub-slider 70 can be located at the center portion of the base 8 at one time. For example, as shown in FIG. 8, a portion of the sub-slider 70 that has slid towards the center of the base 8 (e.g., a shared space where each sub-slider 70 can contact one another) can push the remaining sub-sliders 70 away from the center (e.g., an independent space where each sub-slider 70 is positioned away from one another and may not contact another sub-slider 70). The sub-sliders 70 can each be coupled by one or more fixed slots such that the sub-sliders 70 are slidably coupled to one another. In this configuration, pressing one driving rod 5 can facilitate opening one through hole 43 at a time to switch between one discharge pipeline at a time.

In some embodiments, as shown in FIG. 10, the driving rod 5 includes a tapered section between the sealing seat 54 and the rod body 51 (e.g., a width or diameter of the tapered section is gradually reduced from the sealing seat 54 to the rod body 51). When the driving rod 5 is moved upward toward the through hole 43, the tapered section can partially enter the through hole 43 to block the through hole 43. The sealing seat 54 can include a generally "I" or "T" shape to facilitate sealing the through hole 43. The sealing seat 54 can include an elastic seal (e.g., an O-ring) sleeved on the sealing seat 54 to facilitate sealing off the through hole 43.

In some embodiments, the limiting block 53 and the driving block 52 can be positioned on opposite sides of the sealing seat 54. In some embodiments, the driving block 52 can include a generally wedge shape and can at least partially match with a profile of the wedge guide face 75 such that the driving block 52 easily engages with the wedge guide face 75. In some embodiments, the limiting block 53 can include a generally wedge shape and can at least partially match with a profile of the limiting locking groove 73 such that the limiting block 53 easily engages with the limiting locking groove 73.

As described herein, when the driving rod 5 enters the limiting locking groove 73, the limiting locking groove 73 provides a limiting function for the driving rod 5 such that positions of the driving rod 5 and the sub-slider 70 are relatively fixed. When the sub-slider 70 is subjected to driving forces transmitted by other sub-sliders 70 (e.g., when other driving rods 5 are pressed), the sub-slider 70 moves away from the center of the base 8 such that the driving rod 5 is positioned away from the limiting locking groove 73 and the driving rod 5 is capable of vertically withdrawing from the limiting locking groove 73.

As an example, one of the plurality of driving rods 5 (for illustrative purposes will be referred to as the "first driving rod") can be pressed down to move downward into a corresponding transmission cavity of one of the plurality of sub-sliders 70 (for illustrative purposes will be referred to as the "first sub-slider"). Such movement compresses the corresponding spring 6 coupled to the first driving rod. One of the through holes 43 of the body 4 that corresponds to the first driving rod (for illustrative purposes will be referred to as the "first through hole") is therefore unsealed to allow fluid communication between the body 4 and the cavity of the base 8. In this configuration, fluid provided by the inlet of the base 8 enters the body 4 through the first through hole such that the discharge pipeline corresponding to the first through hole (for illustrative purposes will be referred to as the "first discharge pipeline") is unblocked. At this time, the remaining driving rods 5 (for illustrative purposes will be referred to as the "second driving rods") are all in an upward position to seal the remaining through holes 43 (for illustrative purposes will be referred to as the "second through holes") corresponding to each of the second driving rods. In this sealed configuration, fluid provided by the inlet of the base 8 cannot enter the body 4 through the second through holes, so that the discharge pipelines corresponding to the remaining second through holes (for illustrative purposes will be referred to as the "second discharge pipelines") are all blocked.

When any one of the second driving rods are pressed, the pressed second rod begins to move downward. During this movement, the second sub-slider corresponding to the pressed second driving rod is pressed by the second driving rod such that the second sub-slider moves towards the center of the base 8. Because the sub-sliders 70 are each slidably coupled and can contact one another, movement of the second sub-slider towards the center of the base 8 causes the first sub-slider corresponding to the first driving rod to move away from the center of the base 8 (e.g., by pushing the first sub-slider) such that the first sub-slider moves back into its initial position. Movement of the first sub-slider causes the first driving rod to disengage from the limiting locking groove 73 and the spring 6 biases the first driving rod to reset to its initial position in which the first driving rod blocks the first through hole. Simultaneously, the second driving rod moves downward to engage with the limiting locking groove 73 of the second sub-slider such that the discharge pipeline corresponding to the second through hole is unblocked. It should be noted that if there are more than two sub-sliders, the movement of the second sub-slider also causes the remaining second sub-sliders corresponding with the remaining second driving rods to move.

In other words, when one of the driving rods 5 engages with one of the sub-sliders 70 (e.g., a first sub-slider), the driving rod 5 causes the sub-slider 70 to slide towards a middle portion of the base 8. As the sub-slider 70 moves inward, a portion (e.g., a topmost portion) of the limiting locking groove 73 locks the driving rod 5 in a vertical position to allow fluid to enter through the corresponding through hole 43. When the sub-slider 70 reaches the middle portion of the base 8, the end portion of the sub-slider 70 engages (e.g., contacts, pushes, presses, etc.) the end portions of the other three sub-sliders 70 (e.g., the second sub-sliders), which can freely slide relative to each respective guide rod 83, and the second sub-sliders 70 are pushed to slide away from middle of the base 8 and towards the base side wall 82. When the sub-sliders 70 move away from the middle of the base 8, each respective limiting locking groove 73 moves away from each respective driving rod 5 and each respective spring 6 biases the driving rods 5 upward towards the through holes 43 corresponding to the three second sub-sliders to close (e.g., block, seal) the through holes 43. As such, only one through hole 43 and one corresponding discharge pipeline remains open at one time.

In some embodiments, the driven slider set 7 can include at least two sub-sliders 70. For example, the driven slider set 7 can include two sub-sliders 70, three sub-sliders 70, four sub-sliders, or more sub-sliders 70. In the exemplary embodiment depicted in the figures, the driven slider set 7 includes four sub-sliders 70 distributed in a cross shape such that every two sub-sliders 70 are oppositely arranged and slide back and forth in the cavity along a diagonal line. Each of the four sub-sliders 70 are slidably coupled such that when one sub-slider 70 moves, the remaining sub-sliders 70 move together. For example, as shown in FIG. 7, the sub-sliders 70 can mesh together at a center portion of the base 8 such that a portion of the sub-sliders 70 can contact one another. The amount of the sub-sliders 70 can correspond to the amount of the guide rods 83 and/or the amount of the driving rods 5. For example, the switching valve 100 can include the same amount of guide rods 83 and driving rods 5. In some embodiments, each of the sub-sliders 70, guide rods 83, and driving rods 5 can be symmetrically distributed along a center portion of the base 8. By way of example, if the driven slider set 7 includes two sub-sliders 70, the sub-sliders 70 can be positioned at an angle of 180 degrees relative to one another. If the driven slider set 7 includes three sub-sliders 70, the sub-sliders 70 can be positioned at an angle of 120 degrees relative to one another. If the driven slider set 7 includes four sub-sliders 70, the sub-sliders 70 can be positioned at an angle of 90 degrees relative to one another, and so on.

In some embodiments, the base bottom plate 81 can support the driven slider set 7 (e.g., the driven slider set 7 can abut, contact, or position proximate the base bottom plate 81). In some embodiments, the base side wall 82 can facilitate limiting a potential sliding distance of the driven slider set 7 (e.g., the sub-sliders 70 may contact the base side wall 82 at a maximum sliding distance). As another example, a maximum movement range of the driven slider set 7 can be limited by the guide rod 83 within the limiting hole 76 such that each sub-slider 70 can only slide the distance that the limiting hole 76 can move relative to the guide rod 83.

Figure 11:
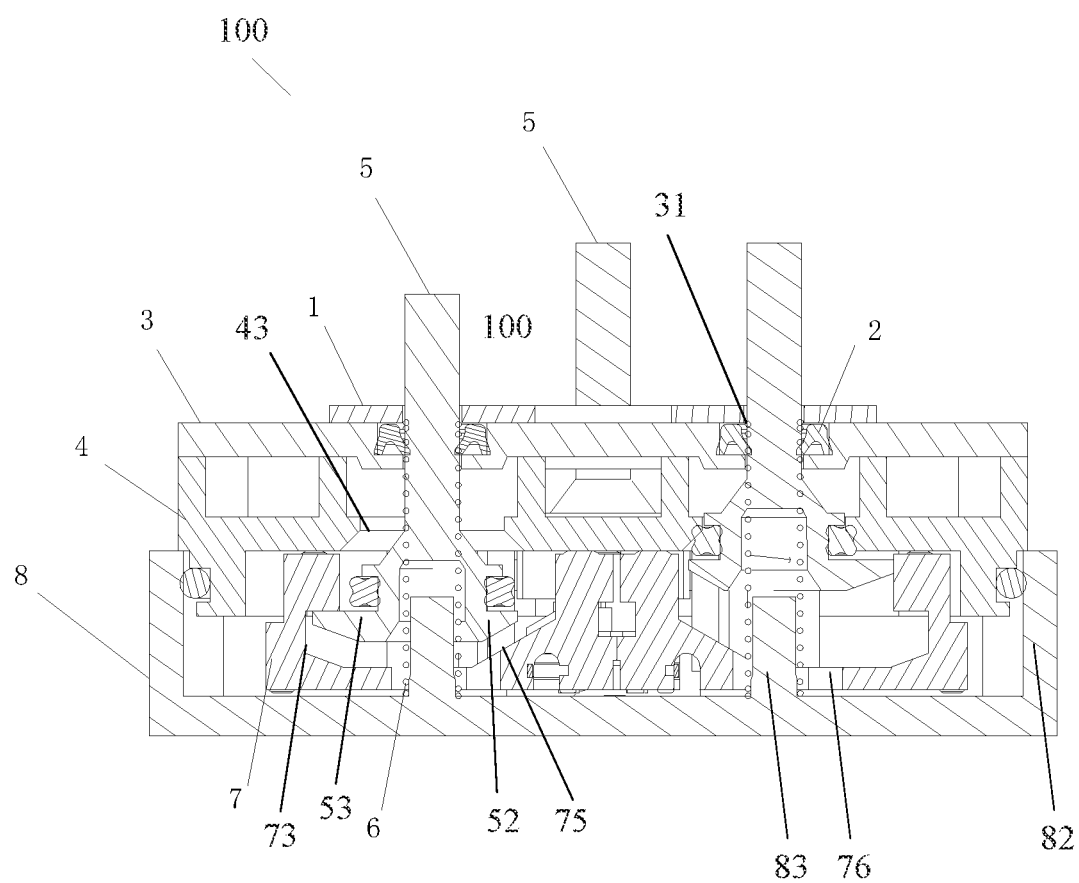
FIG. 11 is a cross-sectional view of the switching valve shown in FIG. 1 along line C-C in an example use state, according to an exemplary embodiment.
Figure 12:
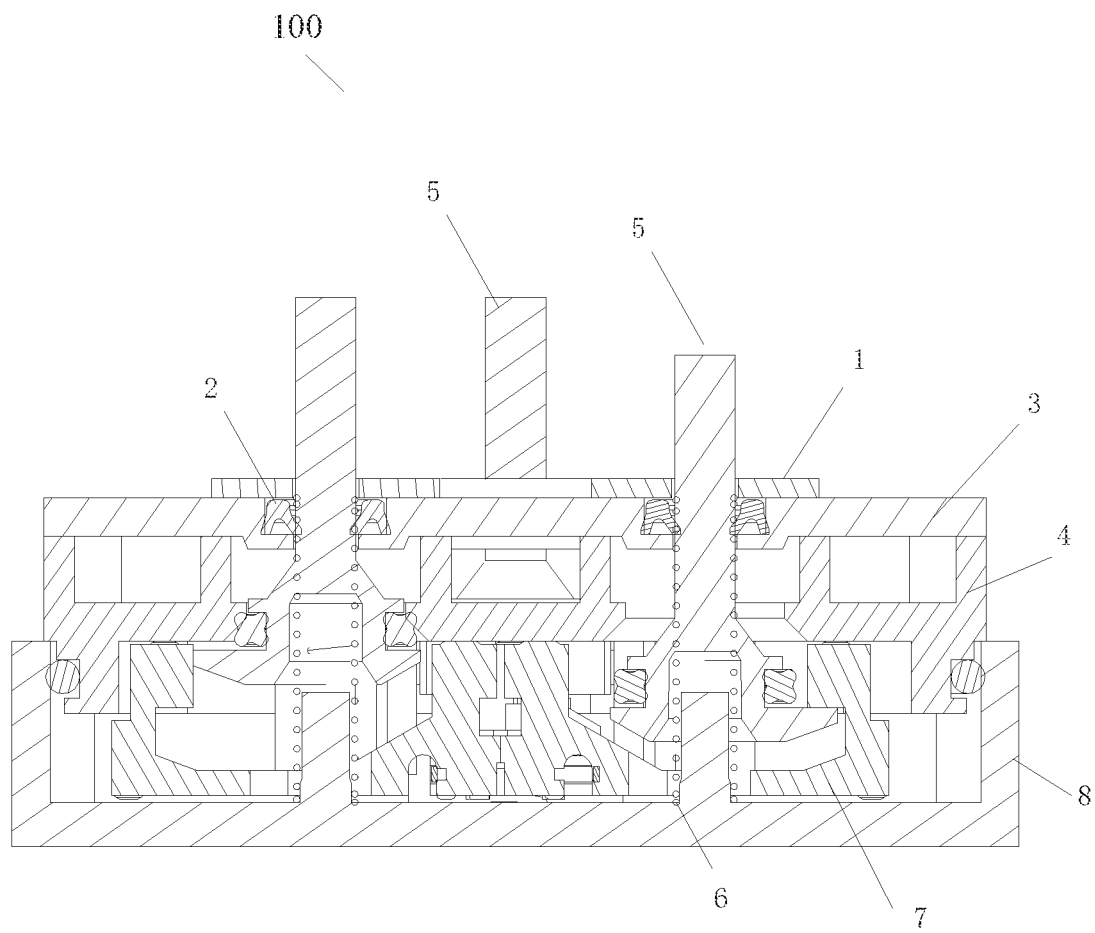
FIG. 12 is a cross-sectional view of the switching valve shown in FIG. 1 along line C-C in another example use state, according to an exemplary embodiment.

FIG. 11 is a cross-sectional view of the switching valve 100 in a first example a use state. FIG. 12 is a cross-sectional view of the switching valve 100 in a second example use state. As shown in FIGS. 11 and 12, the driven slider set 7 is located in the cavity of the base 8, the limiting hole 76 of each sub-slider 70 is sleeved on one guide rod 83, and each sub-slider 70 can slide back and forth around the guide rod 83 by the limiting hole 76.

Four driving rods 5 (it should be noted that the fourth driving rod 5 is not visible) penetrate through the body 4 by the through holes 43 of the body 4 and the through holes 31 of the cover plate 3. The sealing rings 2 are positioned in the through holes 31 of the cover plate 3 and the cover plate 3 is covered with the through hole covers 1. The body 4 is hermetically coupled to the base 8. Since the switching valve 100 is in a normally open state, as shown in FIG. 11, the limiting block 53 of one of the driving rods 5 (illustratively referred to as the first driving rod, which is the leftmost driving rod as shown in FIG. 11) enters the limiting locking groove 73. Since the driving pedestal of the driving rod 5 is far away from the corresponding through hole 43, the through hole 43 is open and allows fluid to flow through the body 4 from the cavity, such that the discharge pipeline is unblocked and fluid can be discharged through an outlet 48 (not visible in FIG. 11) of the body 4. The three remaining driving rods 5 (illustratively referred to as the second driving rods, which are the middle and the rightmost driving rods 5 as shown in FIG. 11) are each positioned in the closed state away from the limitation of the limiting locking grooves 73 and sealing each corresponding through hole 43 such that fluid in the cavity cannot enter the body 4 through the sealed through holes 43 and the three corresponding discharge pipelines are all sealed. When switching the discharge pipelines, as shown in FIG. 12, a second driving rod (e.g., the rightmost driving rod 5 as shown in FIG. 12) is pressed, and during a downward movement of the second driving rod, the driving block 52 of the second driving rod moves along the wedge guide face 75, so as to push the sub-slider 70 corresponding to the second driving rod to move towards a middle portion. Simultaneously, the sub-slider 70 pushes the remaining sub-sliders 70 corresponding with the first driving rod outward towards the base side wall 82 and the remaining two second driving rods are biased upward towards the corresponding through holes 43 by each respective spring 6. The remaining two second driving rods are limited by their respective limiting locking grooves 73 and the discharge pipelines remain sealed such that only the first driving rod can move away from the limitation of the limiting locking groove 73 and reset under an elastic force of the spring 6. Since the first driving rod blocks the corresponding through hole 43, the fluid in the cavity cannot enter the body 4 through the sealed through hole 43 such that a corresponding discharge pipeline of the first driving rod is switched from open to closed. The second driving rod moves down and enters the limiting locking groove 73 such that the second driving rod is far away from the corresponding through hole 43 to open the through hole 43 such that fluid in the cavity enters the body 4 through the unsealed through hole 43 and the corresponding discharge pipeline of the second driving rod is switched from closed to open.

The specific implementations of the present disclosure are further described hereinafter with reference to the drawings. The same parts are denoted by the same reference numerals. It should be noted that the terms "front", "back", "left", "right", "up", and "down" used in the following description refer to the directions in the drawings, and the terms "inner" and "outer" refer to the directions toward or far away from geometric centers of specific parts respectively.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the spring of the exemplary embodiment described with reference to FIGS. 2 and 10-12 may be incorporated in another portion of the switching valve. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A switching valve, comprising:
a base including a bottom wall and a side wall that extends from the bottom wall of the base along a circumferential direction of the bottom wall;
a body configured to couple to the base to define a cavity between a bottom plate of the body and the bottom wall and the side wall of the base, wherein the bottom plate includes two through holes that are each fluidly coupled to the cavity;
two sliders disposed within the cavity; and
two driving rods each movably coupled to one of the two through holes of the body, wherein each driving rod is configured to move relative to the two through holes to block or unblock each respective through hole;
wherein each slider is configured to slide responsive to movement of one of the two driving rods; and
wherein the two driving rods and the two sliders are configured such that only one through hole is unblocked at one time.

2. The switching valve according to claim 1, wherein the bottom plate of the body includes a partition to separate and define a first pipeline and a second pipeline.

3. The switching valve according to claim 2, wherein:
the body includes two outlets;
the first pipeline is fluidly coupled to a first through hole of the two through holes and a first outlet of the two outlets; and
the second pipeline is fluidly coupled to a second through hole of the two through holes and a second outlet of the two outlets.

4. The switching valve of claim 1, wherein:
a first driving rod of the two driving rods extends through a first through hole of the two through holes; and
a second driving rod of the two driving rods extends through a second through hole of the two through holes.

5. The switching valve according claim 1, wherein:
a first driving rod of the two driving rods aligns with a first slider of the two sliders; and
a downward movement of the first driving rod causes an inward movement of the first slider.

6. The switching valve according to claim 5, wherein the downward movement of the first driving rod unblocks a first through hole of the two through holes.

7. The switching valve according to claim 5, wherein the first slider includes a groove configured to fix a portion of the first driving rod in position responsive to the downward movement of the first driving rod.

8. The switching valve according to claim 5, wherein the inward movement of the first slider causes an outward movement of a second slider.

9. The switching valve according to claim 5, wherein the first slider moves in a direction perpendicular to the movement of the first driving rod.

10. The switching valve according claim 1, wherein each of the two driving rods includes a spring configured to bias the driving rod in an upward direction.

11. A switching valve, comprising:
a body comprising an inlet, two outlets, and two through holes, each of the two through holes fluidly coupling the inlet to a corresponding outlet of the two outlets;
two driving rods each corresponding to a through hole of the two through holes and configured to move in a first linear direction to block or unblock the corresponding through hole; and
two sliders each corresponding to a driving rod of the two driving rods and configured to move away from each other in a second linear direction between an independent space and a shared space responsive to movement of the corresponding driving rod;
wherein movement of the two sliders into and out of the shared space causes only one through hole of the two through holes to be unblocked at one time.

12. The switching valve of claim 11, wherein the body includes separate pipelines between the two through holes and the two outlets.

13. The switching valve of claim 11, wherein:
a first driving rod of the two driving rods extends through a first through hole of the two through holes; and
a second driving rod of the two driving rods extends through a second through hole of the two through holes.

14. The switching valve according claim 11, wherein the first linear direction is vertical and the second linear direction is horizontal.

15. The switching valve according to claim 11, wherein movement of a first driving rod of the two driving rods unblocks a first through hole of the two through holes.

16. The switching valve according to claim 11, wherein each of the two sliders includes a groove configured to fix a portion of the corresponding driving rod in position responsive to movement of the driving rod.

17. The switching valve according to claim 11, wherein the two sliders are configured to move away from each other such that an inward movement of a first slider of the two sliders causes an outward movement of a second slider of the two sliders.

18. The switching valve according to claim 11, wherein movement of a first driving rod of the two driving rods into a position that unblocks a first through hole of the two through holes causes movement of a first slider of the two sliders into the shared space.

19. The switching valve according to claim 18, wherein movement of the first slider into the shared space causes a second slider of the two sliders to move out of the shared space.

20. A switching valve, comprising:
an inlet, a plurality of outlets, and a plurality of through holes, each of the plurality of through holes fluidly coupling the inlet to a corresponding outlet of the plurality of outlets;
a plurality of driving rods each extending through a through hole of the plurality of through holes and configured to move in a first direction to block or unblock the corresponding through hole; and
a plurality of sliders each aligned with a driving rod of the plurality of driving rods and configured to move away from each other in a second direction between a first space and a second space responsive to movement of the corresponding driving rod;
wherein movement of the plurality of sliders is configured to:
fix the corresponding driving rod in place; and
allow only one through hole of the plurality of through holes to be unblocked at one time.

* * * * *